United States Patent [19]
Moore

[11] Patent Number: 5,823,720
[45] Date of Patent: Oct. 20, 1998

[54] HIGH PRECISION CUTTING TOOLS

[75] Inventor: Richard A. Moore, Newport, Oreg.

[73] Assignee: Bitmoore, Salem, Oreg.

[21] Appl. No.: 698,722

[22] Filed: Aug. 15, 1996

Related U.S. Application Data

[63] Continuation-in-part of Ser. No. 602,222, Feb. 16, 1996, abandoned.

[51] Int. Cl.[6] .............................. B23B 51/00; B23B 27/00
[52] U.S. Cl. ........................... 408/204; 408/211; 408/230
[58] Field of Search ................................... 408/199, 227, 408/204, 207, 229, 230, 225, 228

[56] References Cited

U.S. PATENT DOCUMENTS

| | | | |
|---|---|---|---|
| 221,692 | 11/1879 | Miller | 408/204 |
| 320,966 | 6/1885 | Richards | 408/230 |
| 3,559,513 | 2/1971 | Hougen | 77/69 |
| 3,592,554 | 7/1971 | Takahara | 408/204 |
| 3,609,056 | 9/1971 | Hougen | 408/204 |
| 3,648,508 | 3/1972 | Hougen | 72/325 |
| 3,728,027 | 4/1973 | Watanabe | 356/13 |
| 3,765,789 | 10/1973 | Hougen | 408/204 |
| 3,791,755 | 2/1974 | Warren | 408/76 |
| 3,824,026 | 7/1974 | Gaskins | 408/230 X |
| 3,825,362 | 7/1974 | Hougen | 408/68 |
| 3,860,354 | 1/1975 | Hougen | 408/206 |
| 3,874,808 | 4/1975 | Zaccardelli et al. | 408/1 |
| 3,969,036 | 7/1976 | Hougen | 408/76 |
| 3,977,807 | 8/1976 | Siddall | 408/223 |
| 3,991,454 | 11/1976 | Wale | 29/105 R |
| 4,021,134 | 5/1977 | Turner | 408/204 |
| 4,047,827 | 9/1977 | Hougen | 408/76 |
| 4,072,438 | 2/1978 | Powers | 408/199 X |
| 4,090,804 | 5/1978 | Haley | 408/59 |
| 4,131,384 | 12/1978 | Hougen | 408/68 |
| 4,193,721 | 3/1980 | Hougen | 408/68 |
| 4,204,783 | 5/1980 | Hougen | 408/68 |
| 4,261,673 | 4/1981 | Hougen | 408/5 |
| 4,322,187 | 3/1982 | Hougen | 408/204 |
| 4,322,188 | 3/1982 | Hougen | 408/206 |
| 4,406,334 | 9/1983 | Baumann et al. | 408/204 X |
| 4,452,554 | 6/1984 | Hougen | 408/206 |
| 4,514,120 | 4/1985 | Hougen | 409/137 |
| 4,516,890 | 5/1985 | Beharry | 408/204 |
| 4,992,009 | 2/1991 | Wallach | 408/204 X |
| 5,149,234 | 9/1992 | Durfee, Jr. | 408/211 |
| 5,156,503 | 10/1992 | Tsujimura et al. | 408/199 X |
| 5,401,125 | 3/1995 | Sevack et al. | 408/203.5 |
| 5,417,526 | 5/1995 | Stöck et al. | 408/204 |
| 5,474,406 | 12/1995 | Kress et al. | 408/199 |
| 5,478,179 | 12/1995 | Kress et al. | 408/199 |
| 5,570,978 | 11/1996 | Ress et al. | 408/229 X |
| 5,597,274 | 1/1997 | Behner | 408/204 |
| 5,624,213 | 4/1997 | Anderson | 408/204 X |

FOREIGN PATENT DOCUMENTS

| | | | |
|---|---|---|---|
| 2910299 | 9/1980 | Germany | 408/204 |
| 3629034 | 3/1988 | Germany . | |
| 58-0034706 | 3/1983 | Japan | 408/204 |
| 2221412 | 2/1990 | United Kingdom | 408/204 |
| WO095005262 | 2/1995 | WIPO | 408/204 |
| 9518693 | 7/1995 | WIPO | 408/215 |

OTHER PUBLICATIONS

Patent Abstracts of Japan, vol. 095, No. 009, 31 Oct. 1995 & JP 07 164225 A (Dijet Ind Co Ltd), 27 Jun. 1995.

*Primary Examiner*—Andrea L. Pitts
*Assistant Examiner*—Henry W. H. Tsai
*Attorney, Agent, or Firm*—Stoel Rives LLP

[57] ABSTRACT

Cutting tools in the form of drill bits, lathe knives, and saw teeth are formed with a cutting edge to slice off material from a work piece and with a construction providing a minimal contact of the tool against the side wall of a hole or kerf cut by the tool.

22 Claims, 11 Drawing Sheets

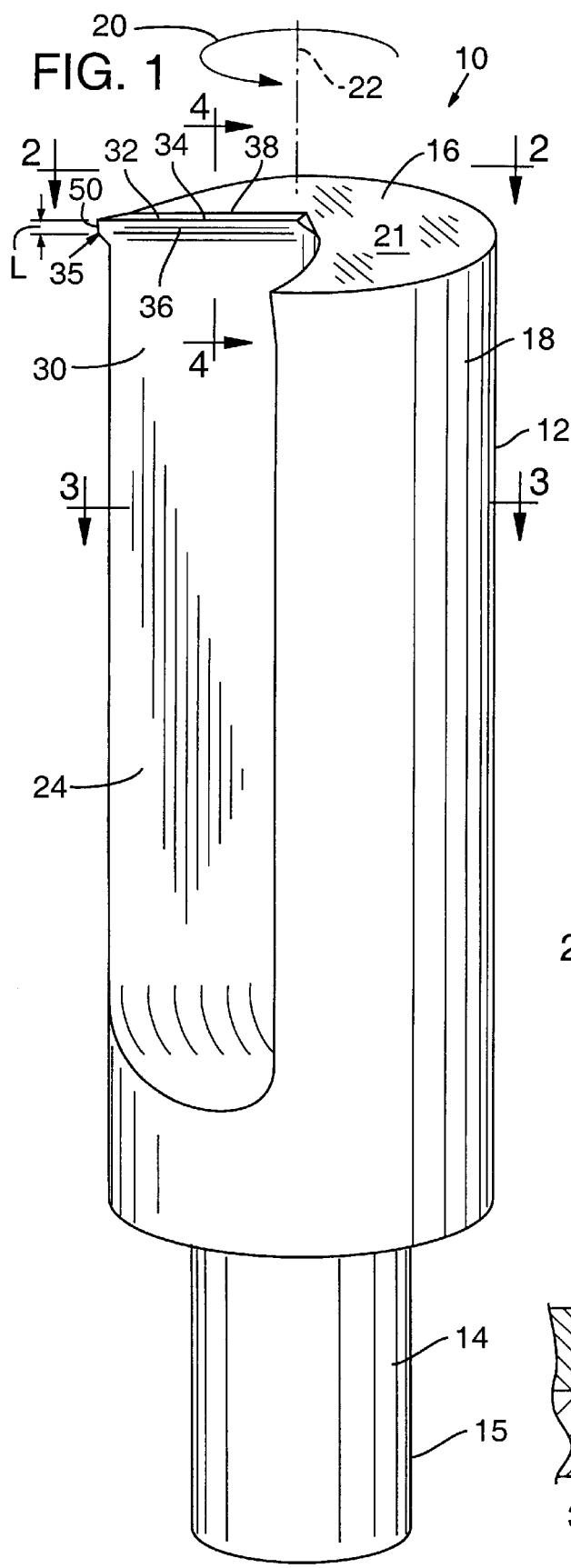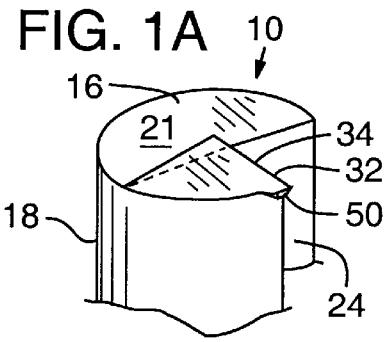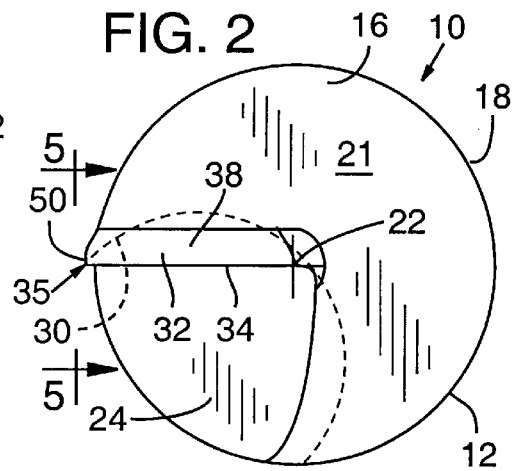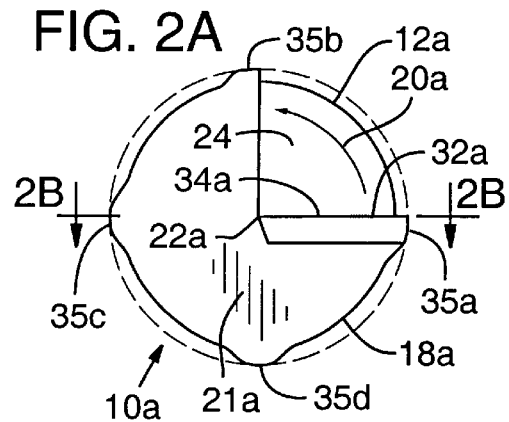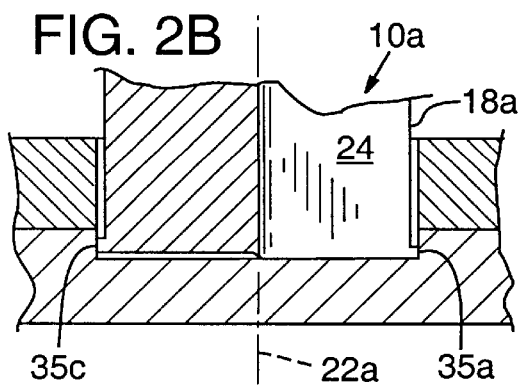

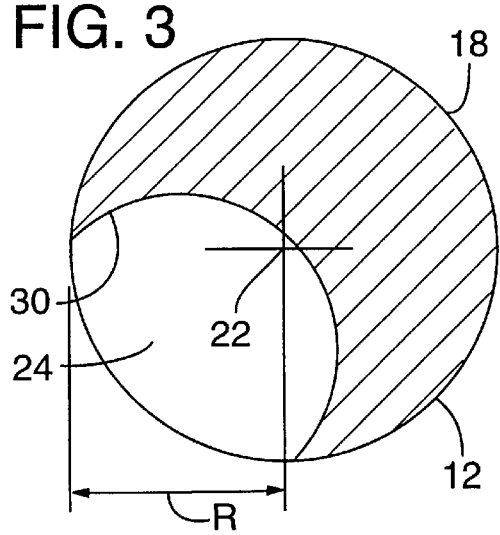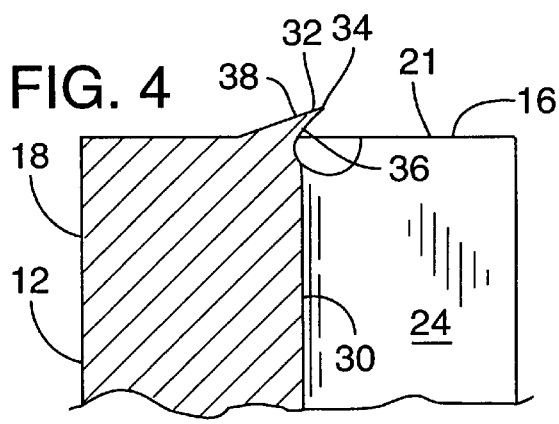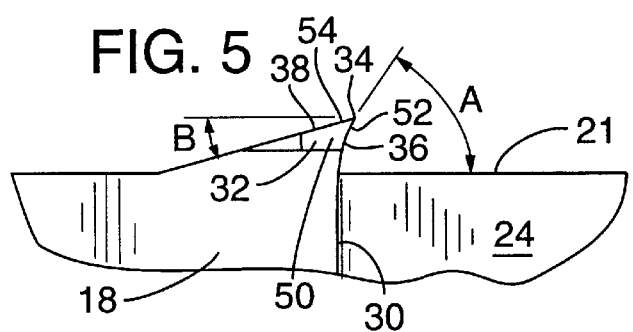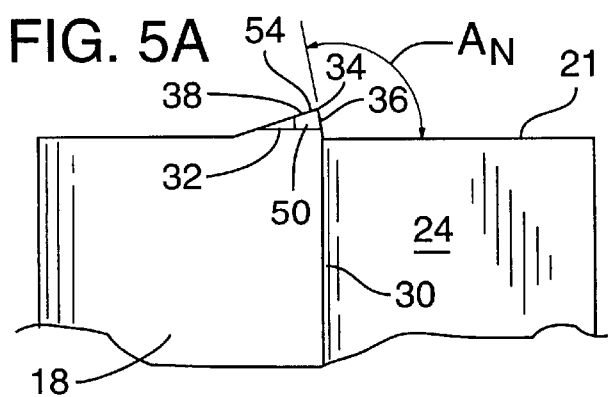

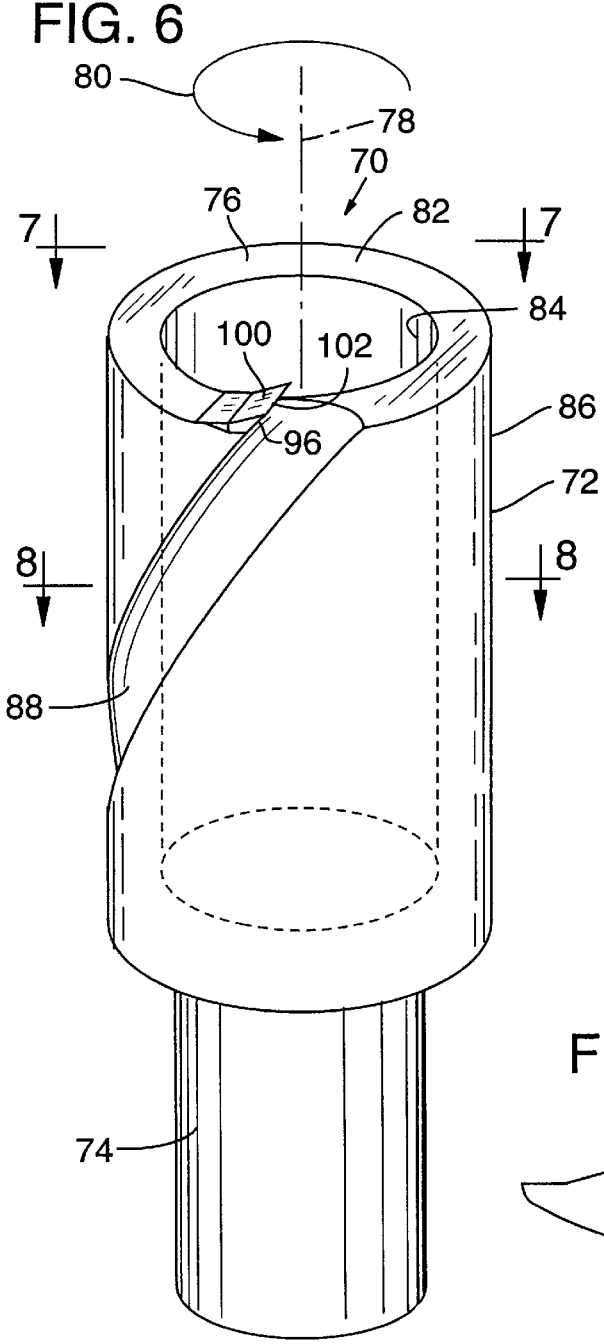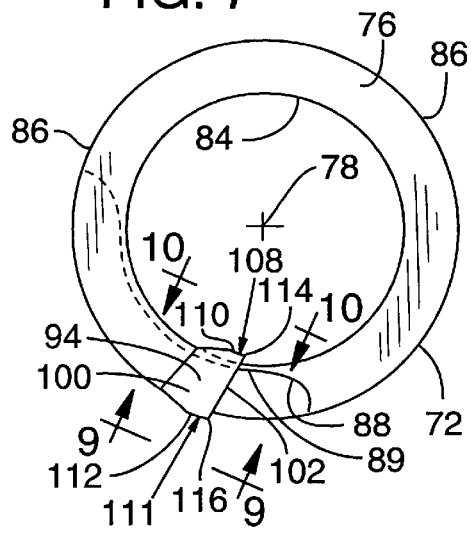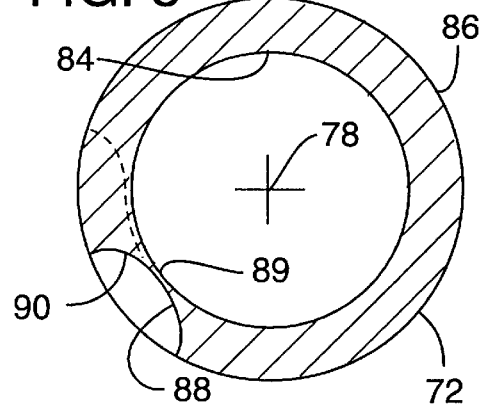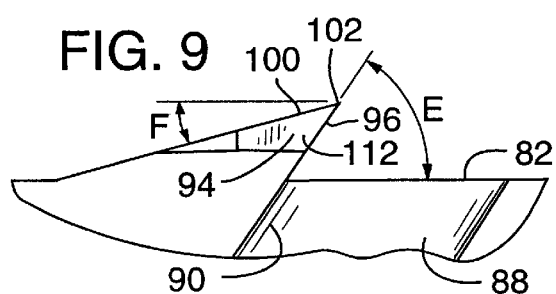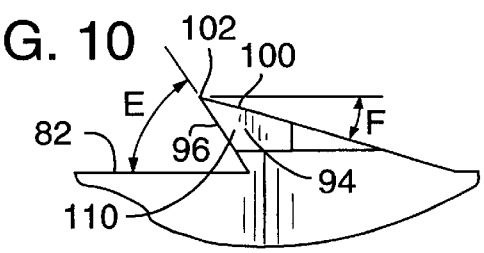

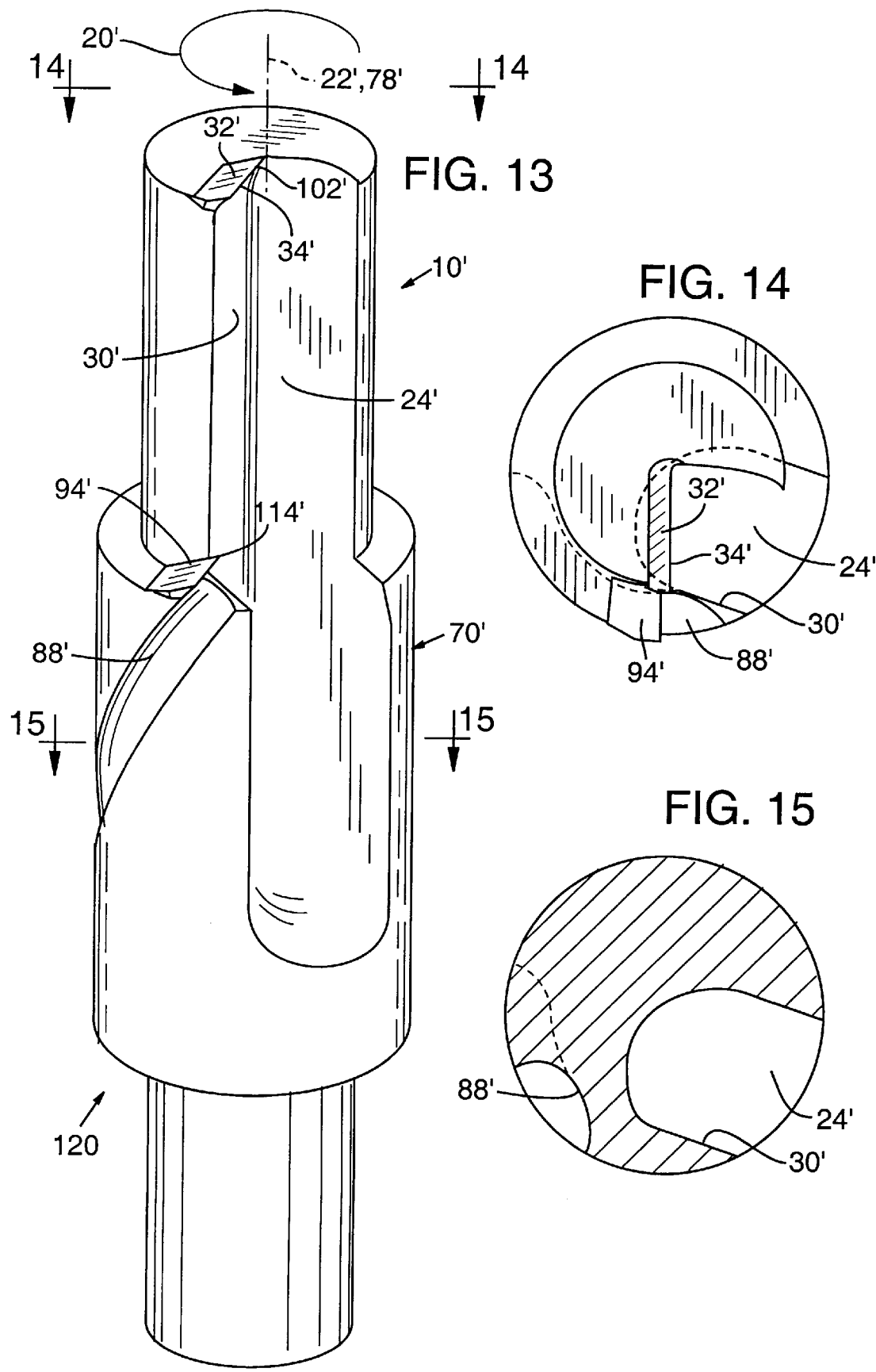

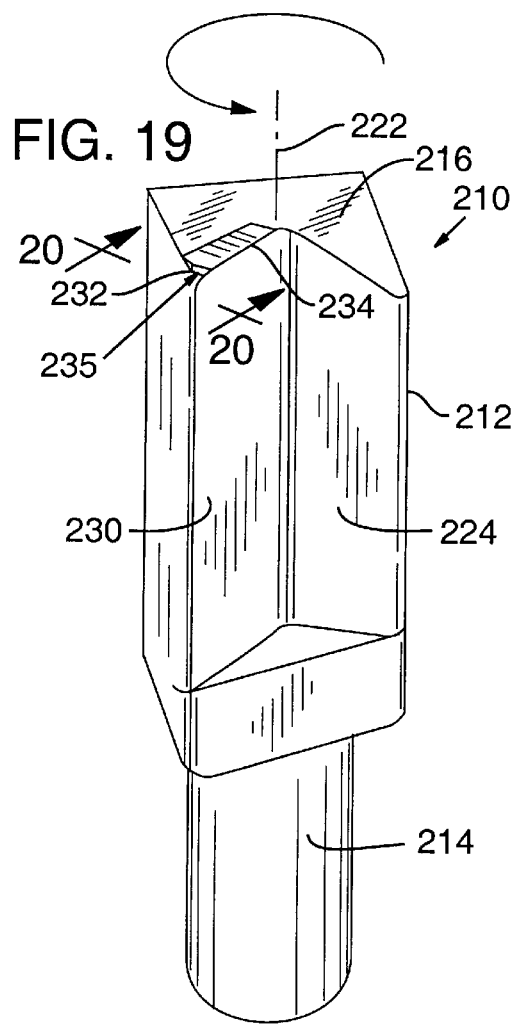
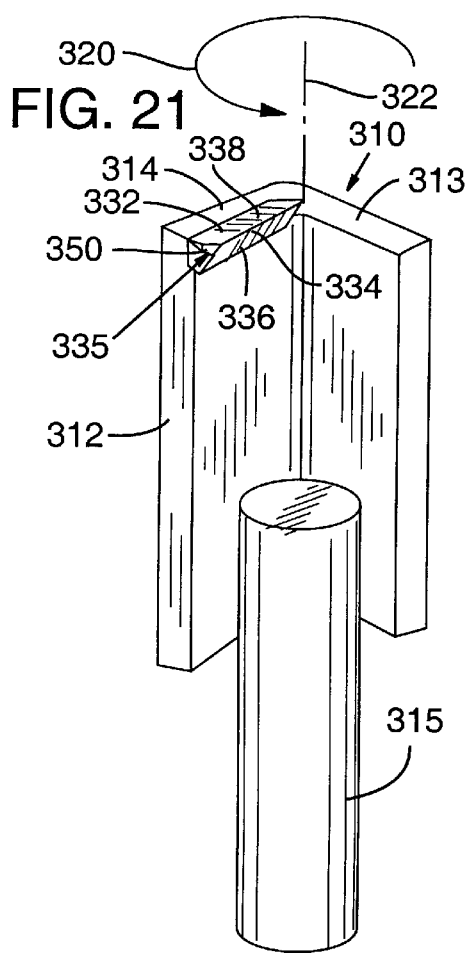
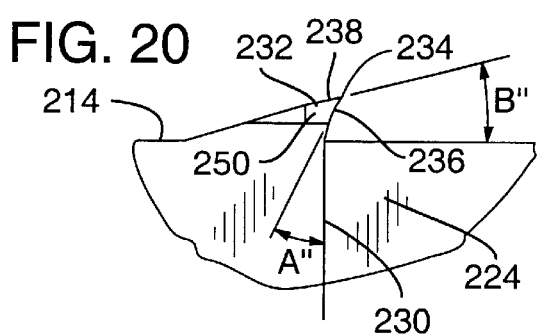
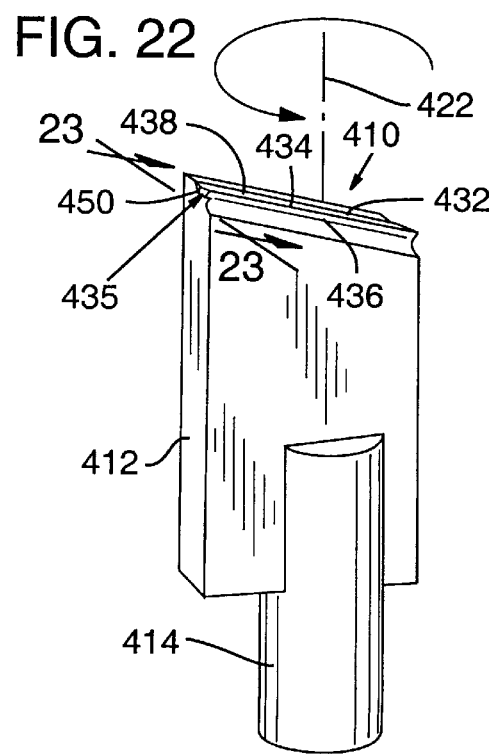
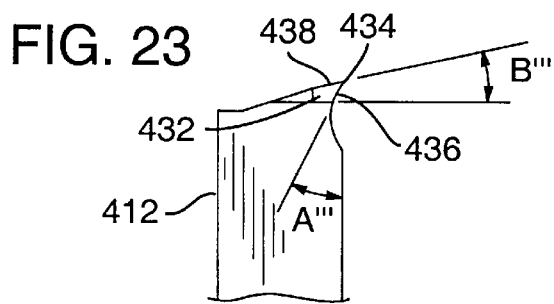

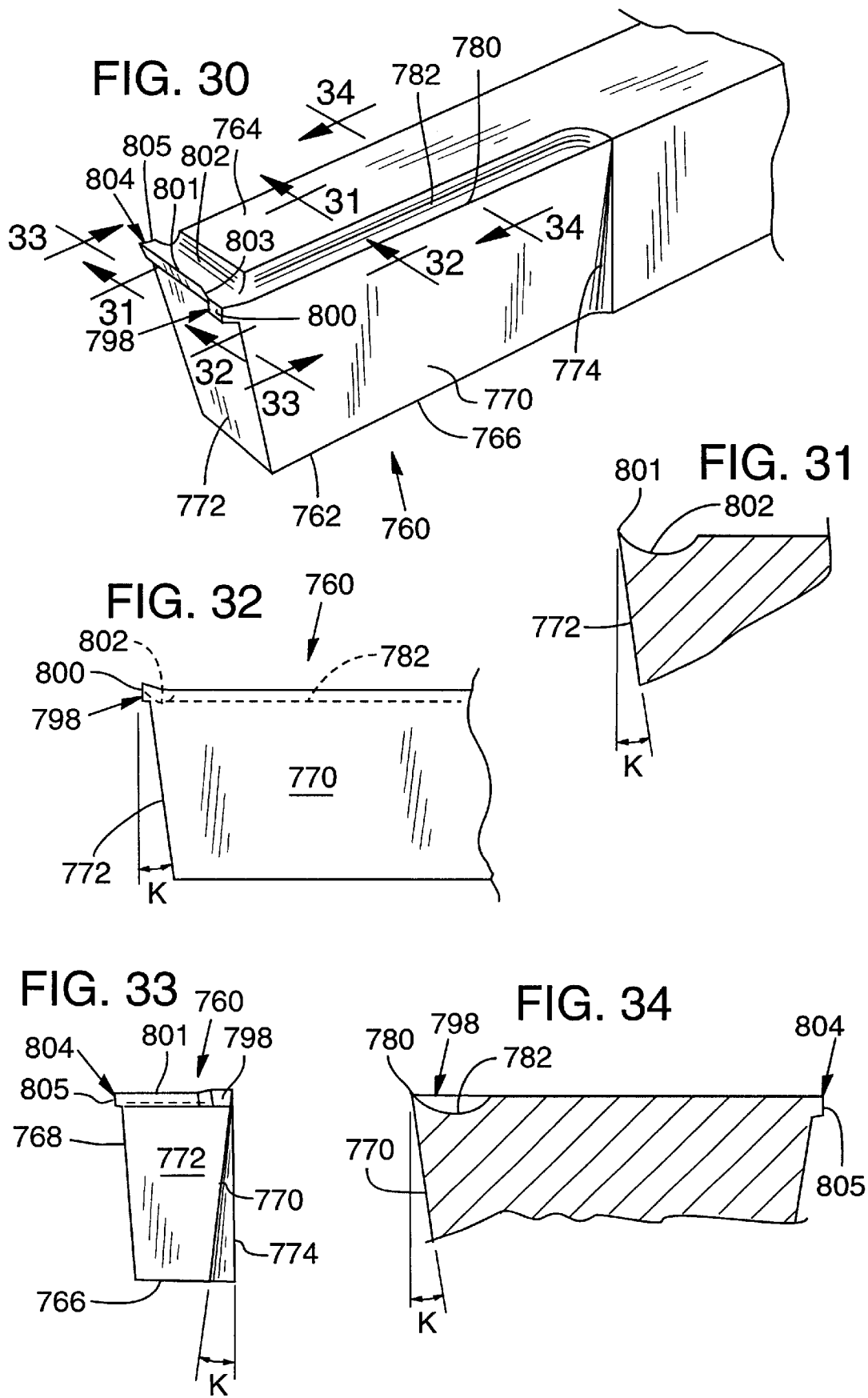

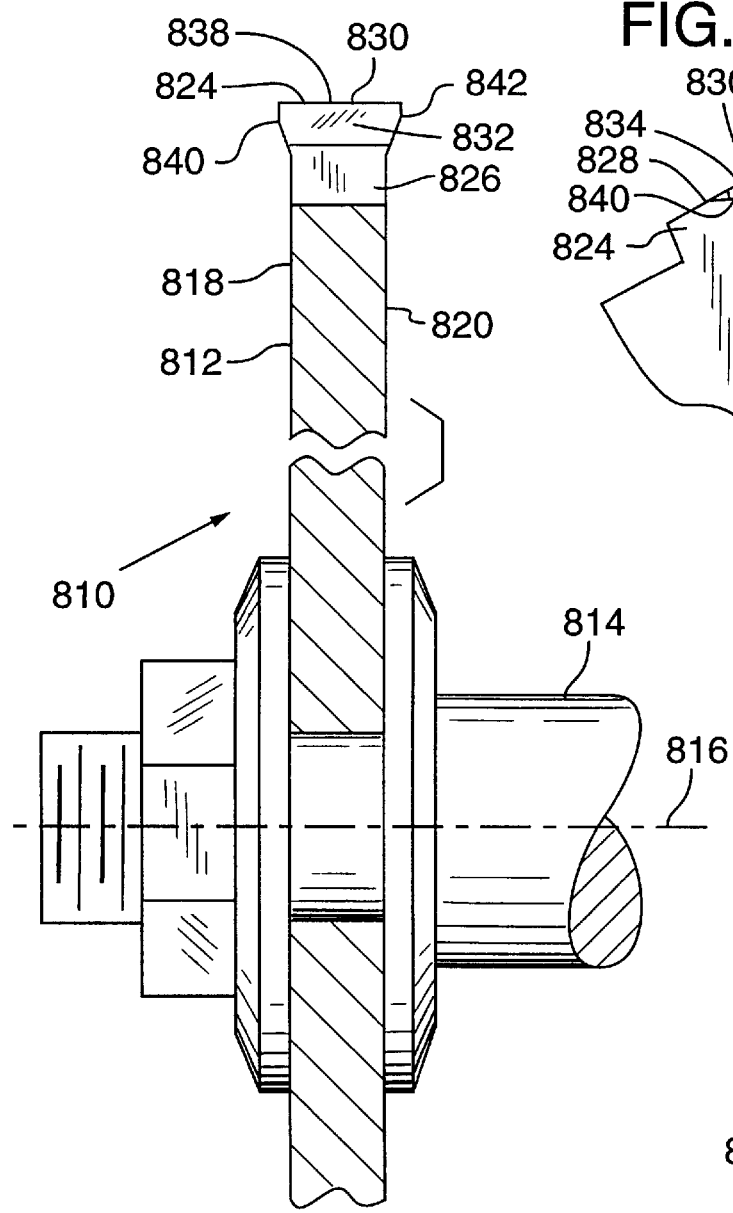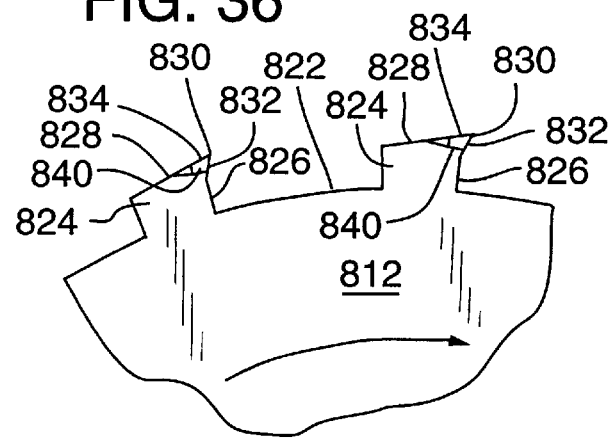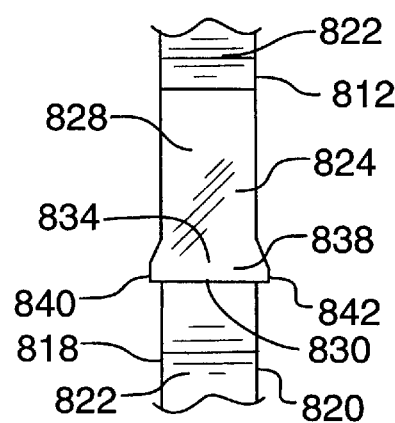

HIGH PRECISION CUTTING TOOLS

RELATED APPLICATION

This is a continuation-in-part of application Ser. No. 08/602,222, filed Feb. 16, 1996, now abandoned.

TECHNICAL FIELD

This invention relates to improvements in cutting tools and, more particularly, to the configuration of cutting edges incorporated in tools such as drill bits, milling cutters, lathe knives, saws, and like cutting devices.

BACKGROUND OF THE INVENTION

Conventional tools such as drill bits for cutting holes in a work piece have pointed tips that position the centers of the holes to be drilled. A drill bit with a pointed tip and no means to ensure lateral stability tends to wander as it finds the center of the hole and thereby exerts a lateral force against its side wall. The result is a drilled hole that is of nonuniform diameter along its length and often has an inadequate smoothness of surface finish. Moreover, slight eccentricity in the rotation of the chuck holding the drill bit exacerbates the lateral deflection of the drill bit path and further contributes to the dimensional imprecision of the drilled hole. Dimensional imprecision also results from the generation in the material a significant amount of heat caused by the lateral force exerted by the drill bit.

A consequence of drilling holes with imprecise dimensions is the inability to drill a pair of side-by-side holes with a thin partition between them. In the case of a lathe tool, the application of lateral force to remove material from the work piece can cause distortion of the work piece as it is being cut.

SUMMARY OF THE INVENTION

An object of the present invention is to provide a cutting tool so configured that the tool, in removing material from a work piece, provides on the work piece a surface having a high degree of smoothness.

Another object is to provide a tool that does not require the use of cooling fluid or cutting oil during the removal of material from a work piece.

A further object of the invention is to provide a drill bit capable of drilling dimensionally accurate, smooth-sided holes in work pieces.

Still another object is to provide a lathe tool that can be utilized to remove material from a work piece being turned in a lathe without applying any laterally directed pressure to the work piece during lathe tool travel, thereby avoiding distortion of the work piece.

Yet another object of the invention is to provide a drill bit configuration that enables the removal of material from a work piece with an application of a minimum amount of pressure in the direction perpendicular to the face of the work piece that is approached by the tool.

The present invention is a cutting tool that removes material from a work piece with dimensional precision while transferring minimal heat to the work piece as material is removed from it. The present invention can be implemented in a number of cutting tools such as drill bits, lathe tools, circle saw blades, and like cutting tools in which the tool and the work piece move in opposite directions during cutting.

The cutting tool has a body of which a cutting tooth is an integral part. The cutting tooth includes a cutting edge and at least one guide projection. The cutting edge removes the material from the work piece and thereby transfers most of the heat generated to chips or ribbons of material removed instead of to the work piece as it is being cut. The guide projection extends outwardly of the body and is the only portion of the cutting tooth that contacts the work piece to ensure dimensional uniformity of the finished side surface. This is especially true when drilling through layers of a composite specimen of materials of different degrees of solidity or hardness, which would tend to deflect the cutting path direction at the transition between adjacent layers. There is, therefore, substantially reduced energy required to remove material from the work piece and substantially reduced, if any, need for a coolant or cutting oil during cutting.

In one implementation of the invention, the cutting edge is formed so that it does not form a point about which the cutting tool could center itself on the work piece. This implementation enables cutting into a work piece surface at an angle of other than 90° or into a corner of a block of material. Because it is the only portion of the cutting tooth that contacts the side surface of the work piece, the guide projection engages relatively cool material, does not undergo an appreciable increase in temperature, and has very little surface contact area. Thus, the cutting tool undergoes negligible lateral deflection during cutting and thereby produces a highly dimensionally accurate cut in and a highly polished side surface on the finished work piece.

In another implementation of the invention, the cutting tooth is divided into two cutting edge portions that lie along a common plane and form a point which first contacts a work piece being cut. Each cutting edge portion has associated with it a guide projection that extends outwardly of the body to contact the side surface of the work piece and thereby prevent deflection of the cutting tool as it removes material from the work piece.

Additional objects and advantages of this invention will be apparent from the following detailed description of preferred embodiments thereof which proceeds with reference to the accompany drawings.

BRIEF DESCRIPTION OF THE DRAWINGS

FIG. 1 is a perspective view of a drill bit made in accordance with the invention and capable of drilling a circular hole in a work piece;

FIG. 1A shows a work engaging end of the drill bit of FIG. 1 that is modified to have a stepped end face and angled flute;

FIG. 2 is a plan view looking in the direction of the arrows 2—2 of FIG. 1;

FIG. 2A is an end view of a modified version of the drill bit of FIG. 1 having multiple guide projections spaced around the periphery of the work end face of the drill bit body;

FIG. 2B is a fragmentary sectional view taken along lines 2B—2B of FIG. 2A showing the drill bit cutting a hole in a multilayer work piece;

FIG. 3 is a sectional view along lines 3—3 of FIG. 1;

FIG. 4 is a fragmentary sectional view along lines 4—4 of FIG. 1;

FIG. 5 is an enlarged fragmentary view looking in the direction of the arrows 5—5 of FIG. 2;

FIG. 5A shows a variation of the drill bit of FIG. 1 in which the rake face and clearance face define a negative included angle for certain drill bit materials;

FIG. 6 is a perspective view of a drill bit made in accordance with the invention and capable of drilling an annular hole in a work piece;

FIG. 7 is an end view of the bit of FIG. 6 looking in the direction of the arrows 7—7 of FIG. 6;

FIG. 8 is a sectional view taken along lines 8—8 of FIG. 6;

FIG. 9 is an enlarged fragmentary view looking in the direction of the arrows 9—9 of FIG. 7;

FIG. 10 is an enlarged fragmentary view looking in the direction of the arrows 10—10 of FIG. 7;

FIG. 13 is a perspective view of a drill bit made in accordance with the invention and capable of drilling a flat-bottomed, stepped hole in a work piece;

FIG. 14 is an end view of the bit of FIG. 13 looking in the direction of the arrows 14—14 of FIG. 13;

FIG. 15 is a sectional view taken along lines 15—15 of FIG. 13;

FIG. 19 is a perspective view of another embodiment of a drill bit made in accordance with the invention;

FIG. 20 is an enlarged fragmentary view of the end of the cutter element on the bit of FIG. 20 looking in the direction of the arrows 20—20 of FIG. 19;

FIG. 21 is a perspective view of another drill bit made in accordance with the invention;

FIG. 22 is a perspective view of still another drill bit made in accordance with the invention;

FIG. 23 is an enlarged fragmentary view of the end of the cutter element on the bit of FIG. 22 looking in the direction of the arrows 23—23 of FIG. 22;

FIG. 30 is a fragmentary perspective view of a lathe knife made in accordance with the invention;

FIG. 31 is an enlarged sectional view taken along lines 31—31 of FIG. 30;

FIG. 32 is an enlarged fragmentary view of an end of the lathe knife looking in the direction of the arrows 32—32 of FIG. 30;

FIG. 33 is an enlarged end view of the lathe knife of FIG. 30;

FIG. 34 is an enlarged sectional view taken along lines 34—34 of FIG. 30;

FIG. 35 is a fragmentary front elevation view of a circular saw blade with a saw tooth made in accordance with the invention;

FIG. 36 is a fragmentary side elevation of the saw tooth and blade of FIG. 35; and FIG. 37 is a fragmentary top view of the tooth and saw blade of FIG. 35.

DETAILED DESCRIPTION OF PREFERRED EMBODIMENTS

Figure 11:
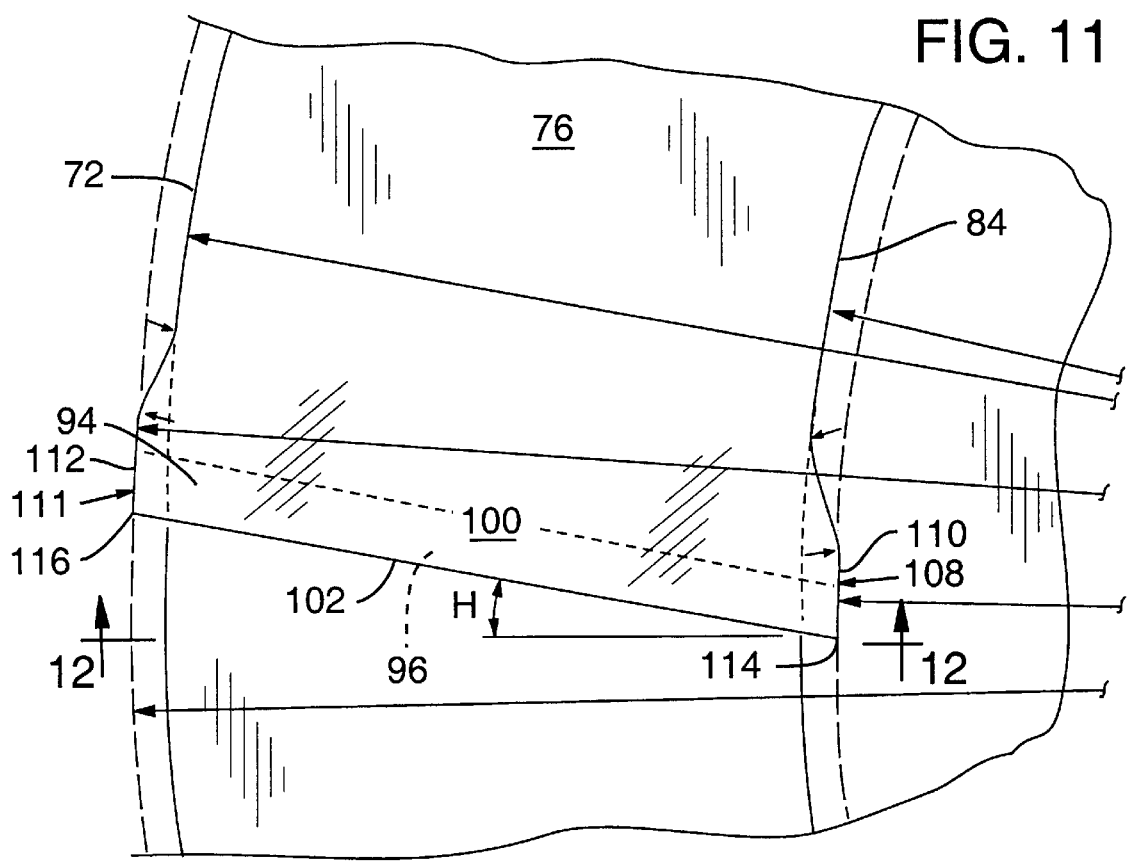
FIG. 11 is an enlarged fragmentary top view of a cutting tooth portion of the bit of FIGS. 6–10, inclusive.

With reference to FIGS. 1–5, a circular hole drill bit 10 comprises a cylindrical shaft or body 12 having a driver engaging end 14, which may include a shank 15 configured for engagement by a suitable chuck (not shown). The opposite end of shaft 12 comprises a work engaging end 16 between which extends a substantially cylindrical side wall 18. Shaft 12 is adapted to be rotated relative to a work piece in a predetermined direction indicated by a counterclockwise pointing arrow 20 when working. Work engaging end 16 may comprise a substantially flat face 21, although the configuration of such face is not critical to the invention except as will be made more apparent hereinafter. (For example, FIG. 1A shows drill bit 10 modified to have a stepped face 21 at work engaging end 16.) Shaft 12 is formed with an elongate flute 24 in side wall 18 thereof extending from work end face 21 towards driver engaging end 14 in a direction generally parallel to an axis of rotation 22. At work end face 21, flute 24 has a minimum depth that is equal to the radius R of shaft 12. Flute 24 has a trailing face 30 with respect to direction 20 of rotation of bit 10 when rotated in its work direction. (FIG. 1A shows a flute 24 having a sharp corner at the step formation of face 21.)

Figure 38:
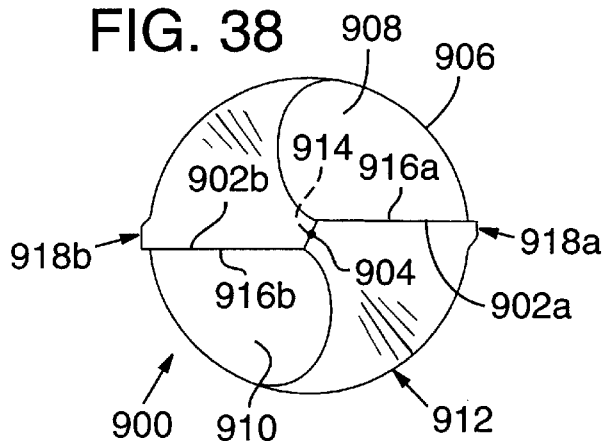
FIGS. 38 and 39 are respective end and fragmentary side elevation views of a drill bit having two inclined cutting teeth extending between a pointed tip and having oppositely positioned guide projections in accordance with the invention.
Figure 39:
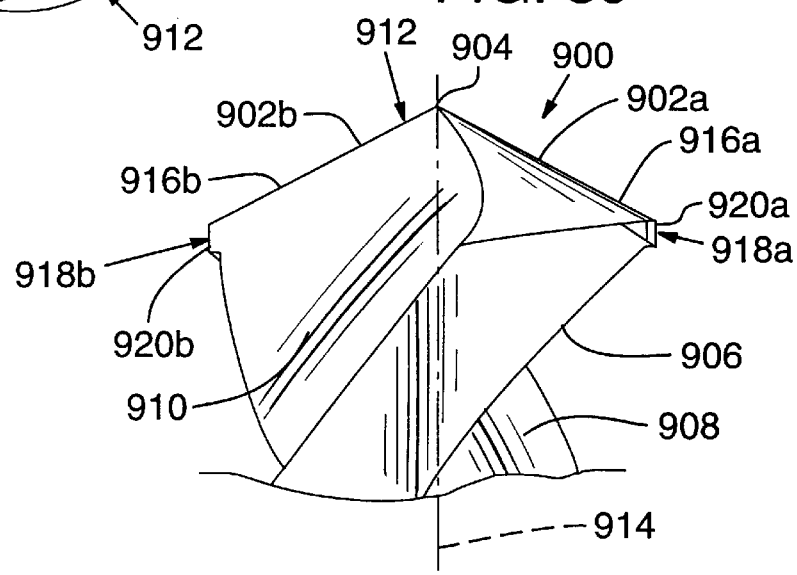

Formed on work end 16 of bit 10 is a cutting tooth 32 that is configured to have a cutting edge 34 and a guide projection 35 that extends laterally of side wall 18. Cutting edge 34 extends from axis 22 and along the portion of guide projection 35 nearer to work engaging end 16. Cutting edge 34 is also positioned above end face 21 as shown in FIGS. 1 and 4, so that cutting edge 34 may engage the work piece when bit 10 is rotated. Cutting edge 34 may extend perpendicularly to axis 22, in which case it terminates at axis 22, or cutting edge 34 may be inclined upwardly as is shown in FIG. 1 from axis 22 toward shaft side wall 18, in which instance cutting edge 34 can extend beyond axis 22. In this latter instance, relief is provided on end face 21 at axis 22 so that the portion of cutting edge 34 extending beyond axis 22 does not counteract the hole cutting operation, as shown in FIGS. 1 and 2. In no instance should cutting edge 34 slope downwardly from axis 22 toward shaft side wall 18. (FIGS. 38 and 39 show an embodiment having multiple cutting edges that are configured to slope downwardly.) Cutting edge 34 is defined by a front rake face 36 extending upwardly and forwardly of trailing face 30 of flute 24 and a clearance face 38 sloping from cutting edge 34 downwardly toward work end face 21 (see FIG. 4). Preferably rake face 36 and clearance face 38 define an included angle A of greater than zero and less than 90 degrees, the embodiment illustrated having an angle A of about 45 degrees. (FIG. 5A shows a negative included angle $A_N$ of greater than 90 degrees for drill bits made of carbide or other hard material.)

Rake face 36 may comprise an arcuate surface formed by hollow grinding the same. Clearance face 38 and a plane perpendicular to axis 22 define an included angle B of about 10 degrees. The magnitude of angle B is not critical so long as clearance face 38 is below the plane of cutting edge 34.

Guide projection 35 is formed with a guide face 50 concentric with axis 22. Guide face 50 is spaced from axis 22 by an amount greater than the spacing of any other part of shaft 12, so that in rotation of bit 10 no portion of shaft 12 will engage the side wall of the hole formed in the work piece by bit 10. As a practical matter, the spacing should be slightly greater than the eccentricity, colloquially known as "slop," in the rotation of the chuck holding the bit, which eccentricity results from slack in the mounting of the chuck in the driving mechanism. The guide projection distance from shaft side wall 18 is also determined by the properties of the drill bit material—the harder the drill bit material, the greater the possible guide projection distance without flexure of drill bit 10. Normally the guide projection distance from side wall 18 in a bit of 1 to 1¼ inches (2.5–3.2 centimeters) in diameter will be between about 0.001–0.250 inch (0.025–6.4 millimeters).

In the direction parallel to axis 22, guide face 50 preferably has a minimum length, L, equal to the depth of the cut made by cutting edge 34 in about one and one-half revolutions of the bit. This may be from 0.001–0.500 inch (0.025–12.7 millimeters) depending on the material being cut. In the circumferential direction, guide face 50 preferably also has a length of no less than the depth of cut. Guide face 50 preferably is maintained at a minimum size so as to minimize the area of contact with the work piece, thereby minimizing the amount of heat generated to not appreciably increase the temperature of the finished surface and to keep drill bit 10 cool. Cutting tooth 32 rearwardly of guide face 50 is tapered inwardly toward side wall 18 leaving enough material to support guide projection 35. This inward taper provides for guide face 50 relief that prevents scoring of the finished surface of the work piece by side wall 18 as bit 10 advances into the work piece to remove material from it. The edges 52 and 54 formed by the intersection of guide face 50 with rake face 36 and clearance face 38, respectively, are preferably slightly rounded as by stroking the edges lightly with a fine grained diamond file. The same is true for corresponding edges in the embodiments of the invention to be described subsequently.

When drill bit 10 is to be used to cut through layers of a composite work piece of different degrees of solidity or hardness (e.g., fibrous material and solid material layers), the length L is preferably chosen to be longer than the depth of cut achievable by at least one revolution of bit 10 in each of two adjacent layers so that projection 35 concurrently contacts the two adjacent layers while cutting through the transition line between them. This is to ensure layer-to-layer overlap of guide projection 35 and thereby prevent deflection of the cutting path of drill bit 10 at the transition between adjacent work piece layers.

Figure 18:
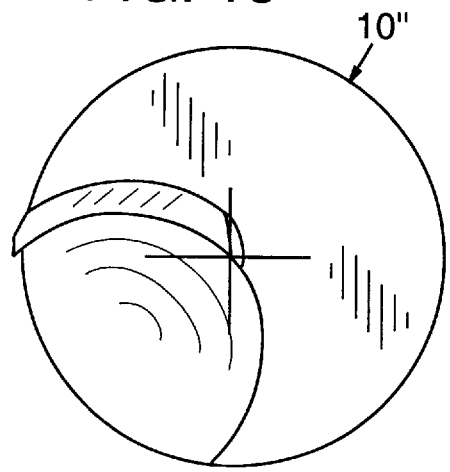
FIG. 18 is an end view of a bit for drilling the circular hole, having a curved cutting edge but otherwise similar to the bit of FIGS. 1–5.

FIG. 18 is an end view of a circular hole drill bit that has a curved cutting edge but is otherwise similar to drill bit 10 of FIGS. 1–5.

FIG. 2A is an end view of an alternative circular hole drill bit 10*a*, which differs from drill bit 10 in that drill bit 10*a* has multiple guide projections 35*a*, 35*b*, 35*c*, and 35*d* concentric with axis 22*a* with equal radii extending and uniformly spaced apart around the periphery of body 18*a* at work end face 21*a* to facilitate cutting through layers of a composite work piece of different degrees of solidity or hardness. Drill bit 10*a* rotates in direction 20*a* about axis 22*a* to cut a hole in the target material. FIG. 2B is a fragmentary sectional view showing drill bit 10*a* cutting into a layer of multiple layer target material. The formation of guide projections 35*a*, 35*b*, 35*c*, and 35*d* on side wall 18*a* is analogous to the formation of guide projection 35 on side wall 18, except as indicated below. Guide projections 35*a*, 35*b*, 35*c*, and 35*d* reduce the propensity of body 12*a* to flex laterally as bit 10*a* passes through a softer material to a harder material and thereby maintain a uniform hole diameter through the multiple layers of target material. Although FIG. 2A shows guide projections 35*a*, 35*b*, 35*c*, and 35*d* at 90 degrees displaced locations, the number and angular separation of the guide projections can be selected depending on the properties of target material that would induce body flexure of the drill bit. Applicant has determined by experimentation that hole diameter uniformity achievable with the use of one guide projection of relatively large length, L, (e.g., longer than depth of cut achievable by about ten revolutions of bit 10) is inferior to that achievable with the use of multiple, shorter length guide projections.

When formed of ordinary tool steel, bit 10 is particularly suited for the drilling of holes in wood, soft metals, such as aluminum and brass, and plastics, such as DELRIN™ and NYLON™, and other like materials. The hole drilled can have a flat bottom (depending on the inclination of cutting edge 34 from axis 22 to side wall 18), will have an exceptionally smooth side wall, and will be accurately dimensioned. If cutting tooth 32 is formed of a harder material, such as a carbide, bit 10 can be used in harder metals, glass, porcelain, and other hard materials.

With reference to FIGS. 6–12, an annular hole cutter 70 comprises a tubular body 72 having a driver engaging end 74 and an opposite work engaging end 76. Body 72 has a longitudinal central axis 78 about which body 72 is adapted to be rotated in a predetermined counter-clockwise direction 80 when utilized to drill an annular hole in a work piece. Work engaging end 76 is formed with a generally planar end surface 82 extending at right angles to axis 78. Body 72 has an inner surface 84 of circular conformation coincident with axis 78 and an outer surface 86 of circular conformation, also coincident with axis 78. In accordance with the invention, outer surface 86 of body 72 is formed with a flute 88 that extends from work engaging end 76 towards driver engaging end 74. The illustrated flute 88 spirals downwardly in the direction opposite to direction of rotation 80, but flute 88 could also extend along body 72 parallel to axis 78 similar to flute 24 in the previously described embodiment. At the working face, flute 88 approaches inner surface 84 but does not extend therethrough, leaving a thin side wall section 89 as best seen in FIGS. 7 and 8.

Formed on work engaging end 76 is a cutting tooth 94, which is defined by a front rake face 96 merging with a trailing face 90 of flute 88 and extending forwardly therefrom above the plane of end surface 82 in direction of rotation 80 at an angle E of about 50 degrees with respect to a plane perpendicular to axis 78. Tooth 94 also has a clearance face 100 inclined at an angle F of about 10 degrees with respect to a plane perpendicular to axis 78. Rake face 96 and clearance face 100 define a cutting edge 102. As in the case of tooth 34, rake face 96 can be inclined at an angle of between about 1 degree to 89 degrees with respect to a plane perpendicular to axis 78, and clearance face 100 can be inclined at an angle of between 1 degree to 89 degrees with respect to rake face 96. If hole cutter 70 is made of a hard material such as carbide, rake face 96 can be inclined at an angle of greater than 90 degrees.

Cutting tooth 94 is formed with an inner guide projection 108 having an inner guide face 110 and an outer guide projection 111 having an outer guide face 112, each of which guide faces 110 and 112 is concentric with central axis 78 and intersects cutting edge 102 to form sharp corners 114 and 116, respectively. Inner and outer guide projections 108 and 111 are preferably handed replicas of each other, and outer guide projection 111 is constructed in a manner consistent with the design principles stated above for guide projection 35 of bit 10.

Inner guide face 110 is spaced inwardly of inner surface 84 toward axis 78 by a distance slightly greater than the slack in the chuck driving the tool so that inner surface 84 will not engage the work piece as the tool penetrates it. Similarly, outer guide face 112 is spaced outwardly from outer surface 86 by approximately an equal amount, so that outer surface 86 will not engage a work piece during the formation of an annular hole therein. Guide faces 110 and 112 each preferably have a length in the direction parallel to axis 78 equal to or slightly greater than the depth of a cut of cutter 70 as it makes about one and one-half revolutions in penetration of a work piece. Guide faces 110 and 112 preferably have a similar length in the circumferential direction and taper inwardly toward the respective inner and outer surfaces 84 and 86 to provide guide face relief for the reasons set forth above for bit 10. Preferably, cutting edge 102 is inclined at a small acute angle H (see FIG. 11) of between about 5 degrees to 10 degrees with respect to a radius of axis 78 intersecting innermost corner 114 of cutting edge 102 so that innermost corner 114 leads the penetration of the tool into a work piece. This configuration causes the severed material to be urged outwardly and into flute 88.

Similar to drill bit 10 of the previously described embodiment, cutter 70 if formed of ordinary tool steel can be used to cut a smooth-sided annular hole in soft metals, such as aluminum and brass, wood, plastics, and like metals, with the hole being exceptionally smooth-sided. With a carbide cutting tooth, cutter 70 can be used in harder metals, ceramics, and other hard materials. Moreover, with either material, the hole may be cut without the utilization of coolant or cutting oil of any kind.

With reference to FIGS. 13–15, a tool bit 120 represents a combination of circular hole drill bit 10 and annular hole cutter 70 previously described but with some modifications to them. Bit 120 includes a center drill bit portion 10' extending from a cutter portion 70'. Bit 120 has, therefore, a cylindrical side wall with first and second portions 10' and 70' of respective smaller and larger radii that form a step transition between portions 10' and 70'. A longitudinally extending flute 24' is formed through bit portion 10' and cutter portion 70' and has a trailing face 30' facing in the direction of rotation 20' of bit 120. Bit portion 10' has a cutting tooth 32' formed thereon, which is configured similarly to cutting tooth 32 of the embodiment of FIGS. 1–5. Cutter portion 70' is formed at the step transition with a cutting tooth 94' thereon, which is configured similarly to cutting tooth 94 of the embodiment of FIGS. 6–12, with a spiraling flute 88' below tooth 94'. An inner corner 114' should terminate in arc of trailing face 30' of flute 24' in bit portion 10'. As it will be evident, bit 120 is capable of drilling a stepped hole in a work piece having a lower portion of a diameter cut by bit portion 10' and an upper portion of a diameter cut by cutter portion 70', with a straight shoulder step transition between them formed by cutting tooth 94'. By forming cutting tooth 94' with a cutting edge 102' that slants angularly with respect to coincident tool axes 22', 78' from its inner edge to its outer edge, a tapering shoulder may be provided between the holes formed by tool bit 120.

Figure 16:
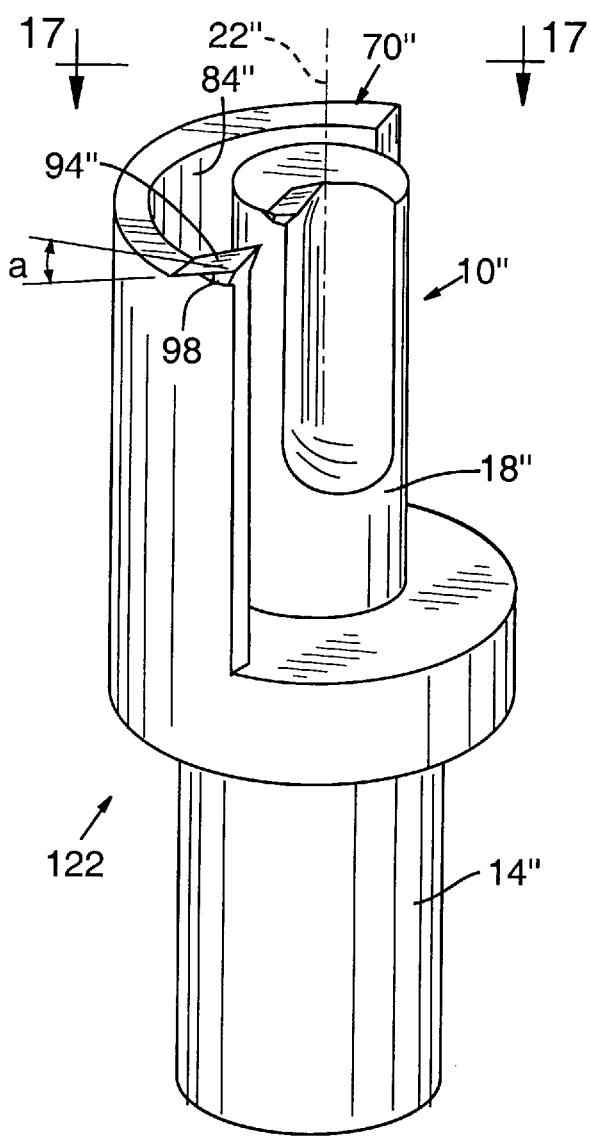
FIG. 16 is a perspective view of a tool made in accordance with the invention and capable of drilling concentric circular and annular holes in a work piece with a concentric sleeve therebetween.
Figure 17:
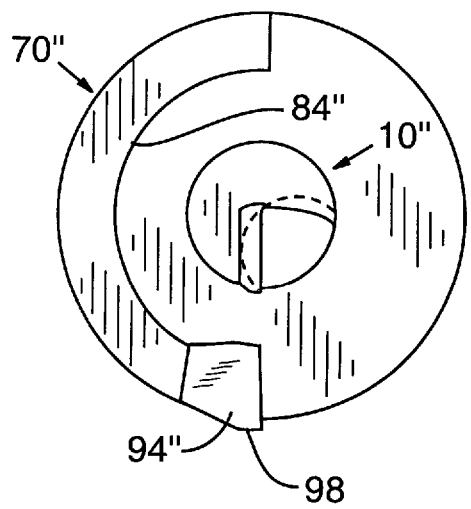
FIG. 17 is an end view of the tool of FIG. 16 looking in the direction of the arrows 17—17 of FIG. 16.

With reference to FIGS. 16 and 17, a tool bit 122 represents a second combination of circular hole drill bit 10 and annular hole cutter 70. Tool 122 includes an inner drill bit portion 10" and an outer annular hole cutting portion 70". Bit portion 10" is configured similarly to bit 10 of FIGS. 1–5 and is axially coincident with a driver engaging end 14". Annular hole cutting portion 70", in this instance, is formed as a semi-circular annular body segment that is coincident with axis 22" of bit 10" and is provided with a cutting tooth 94" substantially identical in construction to cutting tooth 94 of the embodiment of FIGS. 6–12. Tool bit 122 is capable of forming in a work piece a central flat-bottomed opening surrounded by an upstanding concentric wall or sleeve that is surrounded by an annular hole formed by cutting portion 70". Inner surface 84" of hole cutting portion 70" and outer surface 18" of bit portion 10" are separated by a gap that defines the thickness of the sleeve cut in work piece by the operation of tool bit 122.

FIGS. 19–23 illustrate seemingly rudimentary configurations of hole drilling bits but in actuality embody the essential concepts of the invention. With reference first to FIGS. 19 and 20, a hole drilling bit 210 comprises a square body 212 having a driver engaging end 214 and a work engaging end 216. Body 212 has a longitudinal central axis 222. A flute 224 is formed in one of the faces of body 212, and a cutting tooth 232 is formed on work end 216 along a trailing face 230 of flute 224. Cutting tooth 232 extends radially beyond a corner of body 212, a sufficient distance to provide clearance for body 212 as bit 210 is rotated in a work piece, to a point terminating at axis 222. A cutting edge 234 is defined by a front rake face 236 and a rearward clearance face 238, which may be inclined as described for rake face 36 and clearance face 38 of the embodiment of FIGS. 1–5. Clearance face 238 may be inclined at an angle B" from about 2 degrees to 45 degrees from a plane perpendicular to axis 222 and containing cutting edge 234. Cutting edge 234 is formed with a guide projection 235 having a guide face 250 spaced from axis 222 by an amount greater than the spacing of any other part of body 212, whereby in rotation of the bit in a work piece, no portion of body 212 other than guide face 250 will engage the side wall of the hole formed in the work piece. Guide face 250, as in the other configurations, preferably has a length in the axial direction of the tool equal to or slightly greater than the depth of cut made by cutting edge 234 in a work piece in about one and one-half revolutions of the bit and a similar length in the circumferential direction.

With reference to FIG. 21, a bit 310 comprises a body 312 that includes portions 313 and 314, which extend at right angles to each other or at some other angle, preferably acute, the angular relationship providing rigidity to body 312. Body 312 is mounted on a shaft 315 adapted to be engaged in a driving device so as to rotate body 312 in a direction 320 about an axis 322 of shaft 315. Body portion 314 has provided thereon a cutter element 332 on which is a cutting edge 334 defined by a rake face 336 and a clearance face 338, which may be angularly inclined in a similar manner to the faces 236 and 238 of the previously described tool 210. Cutter element 332 has a guide projection 335 with a guide face 350 formed thereon that is concentric with axis 322 and is spaced from axis 322 by an amount greater than the spacing of any other part of body 312, so that in rotation of bit 310 in a work piece, no portion of body 312 other than guide face 350 will engage the side wall of the hole formed of the work piece. Guide face 350 preferably has a length in the direction parallel to axis 322 equal to or slightly greater than the depth of cut made by cutter element 332 in a work piece in about one and one-half revolutions of the bit and a minimum length in the circumferential direction of about the same amount.

With reference to FIGS. 22 and 23, a bit 410 constructed in accordance with the invention comprises a rectangular body 412 adapted to be mounted on a driver engaging element 414 for rotation of the bit about axis 422 of element 414. Body 412 is configured to provide a cutting element 432 thereon, cutting element 432 being defined by a front rake face 436 and a clearance face 438 to form a cutting edge 434. Cutting element 432 has a guide projection 435 with a guide face 450 formed thereon as was described for cutting tooth 32 of drill bit 10. Rake face 436 in this embodiment is defined by a relieved area formed in body 412, as best shown in FIG. 23. Rake face 436 and clearance face 438 are inclined as in the previously described embodiments.

Figure 24:
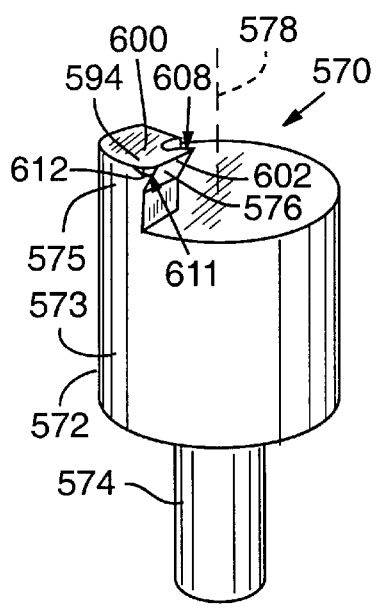
FIG. 24 is a perspective view of still another bit made in accordance with the invention.
Figure 25:
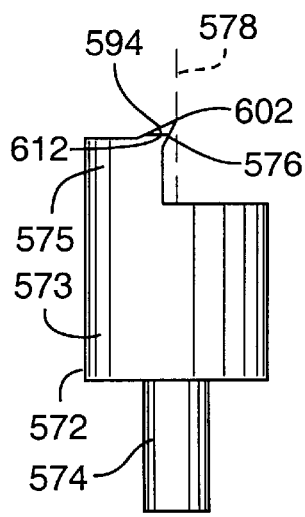
FIG. 25 is a side elevation view of the bit of FIG. 24.
Figure 26:
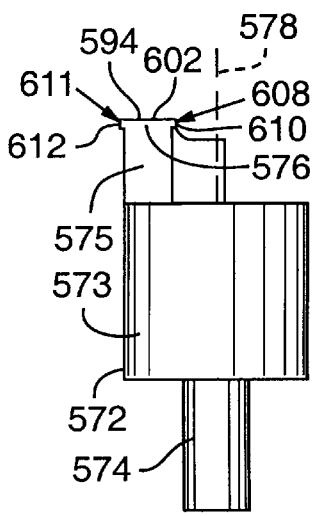
FIG. 26 is a side elevation view taken 90 degrees from FIG. 25.

With reference to FIGS. 24–26, a bit 570 is a simpler form of annular hole cutter 70 of FIGS. 6–12 and is capable of forming an annular hole in a work piece in a similar manner. Bit 570 comprises a body 572 that includes a cylindrical base portion 573 having an axis 578 and from which base portion 573 extends a driver engaging element 574. Extending upwardly from base portion 573 is a cutter tooth mount 575, on the upper end of which is a cutting element 594 defined in the illustrated embodiment by a rake face 576 and a clearance face 600 defining a cutting edge 602. The rake face 576 is inclined at an angle of about 75 degrees with respect to a plane including axis 578 and edge 602. Clearance face 600 is inclined at an angle of about 2 degrees with respect to rake face 576. As in the case of the earlier described embodiments, rake face 576 can be inclined at an angle as little as 1 degree with respect to a plane intersecting cutting edge 602 and axis 578.

Cutting element 594 has an inner guide projection 608 with an inner guide face 610 and an outer guide projection 611 with an outer guide face 612, each of which is concentric with axis 578. Guide faces 610 and 612 are spaced inwardly and outwardly, respectively, a sufficient distance such that the eccentricity of the chuck as a result of slack in the driving tool will not cause any portion of the bit to engage the wall of the annulus formed in the work piece. As for the FIGS. 6–12 embodiment, the lengths of guide faces 610 and 612 are preferably equal to or slightly greater than the depth of cut made by the tool in about one and one-half revolutions. Skilled persons will appreciate that the depth of the annular hole cut is limited by the height of cutter tooth mount 575 measured from the flat surface of cylindrical base portion 573 at the driver nonengaging end of body 572.

Figure 27:
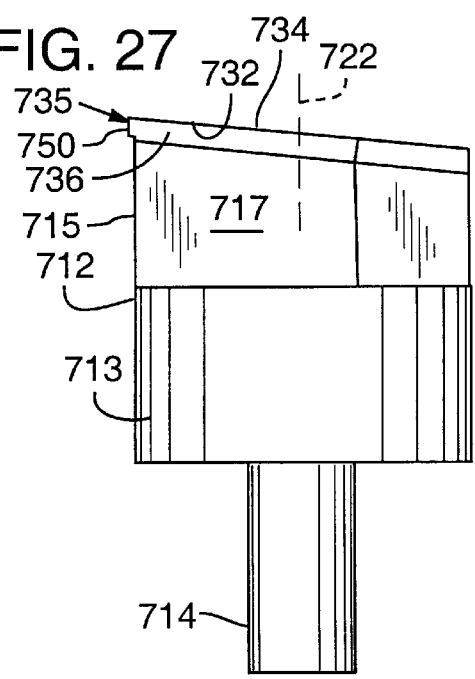
FIG. 27 is a side elevation view of still another bit made in accordance with the invention.
Figure 28:
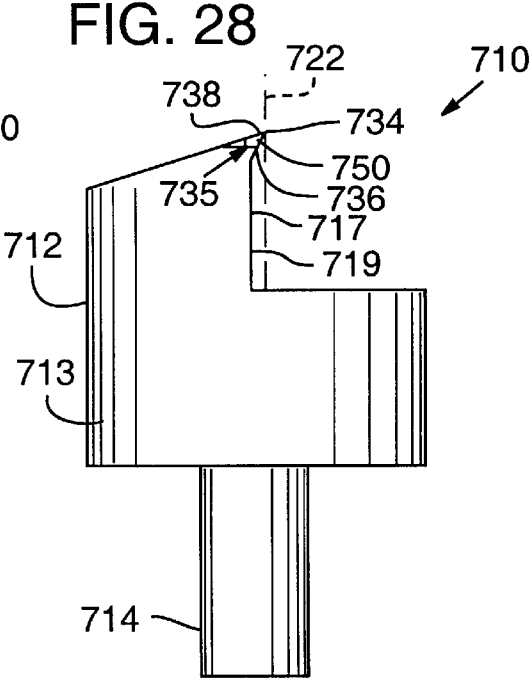
FIG. 28 is a side elevation view of the bit of FIG. 27 turned 90 degrees.
Figure 29:
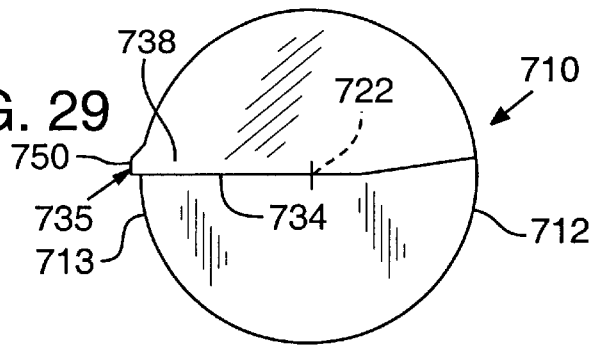
FIG. 29 is a top view of the bit of FIGS. 27 and 28.

FIGS. 27–29 illustrate a hole drill bit 710 constructed in accordance with the invention. Bit 710 comprises a body 712 including a cylindrical base portion 713 from which extends a driver engaging element 714. Extending upwardly from base portion 713 is a cutter tooth mount portion 715 that has a generally semi-cylindrical configuration including a flat front face 717 which extends substantially parallel to an axis 722 of base portion 713 from its periphery past axis 722, but which is spaced behind axis 722 as it appears in FIG. 28, from the direction of rotation. Formed on the upper end of face 717 is a cutter element 732 having a radially extending cutting edge 734 defined by a rake face 736 and a clearance face 738. Rake face 736 is inclined at an angle of about 45 degrees with respect to a plane including cutting edge 734 and axis 722, clearance face 738 and rake face 736 defining an included angle of about 40 degrees. Cutting edge 734 is formed with a guide projection 735 having a guide face 750 that is concentric with axis 722 and spaced sufficiently from outer surface of portion 715 so that no part of portion 715 other than guide face 750 will engage the side wall of a hole drilled by the bit. As in the preceding embodiments, guide face 750 preferably has a length in the axial direction about equal to the depth of penetration of bit 710 in one and one-half cutting revolutions and an approximately equal circumferential length.

FIGS. 30–34 illustrate a lathe knife 760 embodying elements of the present invention. Knife 760 comprises an elongate body 762 of steel or other suitable material having generally planar, parallel top and bottom surfaces 764 and 766, respectively. Side surfaces 768 and 770 are generally parallel to each other and perpendicular to top and bottom surfaces 764 and 766. At the working end of knife 760, end surface 772 is preferably inclined inwardly from top surface 764 to bottom surface 766 so as to provide a small relief angle K of about 3 to 5 degrees. Side surface 770 is also relieved below the top edge thereof adjacent end 772 as shown at 774 in FIGS. 33 and 34, at a similar angle K.

Lathe knife 760 is provided with a side cutting edge 780 by hollow grinding or milling top surface 764 to form a semicircular groove 782 therein from a point adjacent end surface 772 rearwardly so as to provide a cutting edge of desired length. Groove 782 merges with relieved side surface 774 so as to provide, preferably, cutting edge 780 with an included angle of about eight to twelve degrees. End surface 772 is provided adjacent side surface 770 with a guide projection 798 on which is formed a flat guide face 800 that is inclined by angle K relative to end surface 772 and extends from the plane of top surface 764 downwardly a distance at least about and preferably slightly greater than the depth of cut made by cutting edge 780 as it progresses through a work piece, and extends from side surface 770 towards side surface 768 by an equal amount. Thus, guide face 800 is disposed perpendicular to top surface 764.

An end cutting edge 801 is also provided by hollow grinding or milling the top surface from side surface 768 to form a groove 802 along end surface 772. Cutting edge 801 is offset from guide projection 798 by an offset portion 803 defined by the amount of the forward displacement of guide projection 798. Guide face 800 will engage the surface of the work piece and maintain end cutting edge 801 in a slightly spaced position to the cylindrical surface generated on the work piece as lathe knife 760 is moved axially of the work piece.

Preferably, a guide projection 804 is also provided on side surface 768 on which is formed a flat guide face 805 spaced from side surface 768 by about 0.010 inch-0.015 inch (0.25–0.4 millimeter) and extends from the junction of side surface 768 with end surface 772 a distance at least to and preferably slightly greater than the depth of cut made by end cutting edge 801 in about one and one-half rotations of the work piece into which lathe knife 760 is plunged and has a similar extension the direction downwardly from top surface 764. Guide face 805 minimizes the contact of lathe knife 760 with the cut surface and side surface 768.

The presence of end cutting edge 801 is not essential to the inventive aspects of the invention but its inclusion permits lathe knife 760 to make a plunge cut into a rotating work piece whereafter lathe knife 760 may be moved laterally to engage side cutting edge 780 to cut material from the adjacent side of the plunge cut.

FIGS. 35–37 illustrate a portion of a circular saw blade 810 having teeth constructed in accordance with the invention. Blade 810 comprises a circular body 812 adapted to be mounted on a shaft 814 for rotation about an axis 816. Blade 810 has flat, parallel side surfaces 818 and 820 and a peripheral surface 822. Extending outwardly of peripheral surface 822 are a plurality of cutter elements 824 spaced apart uniformly around the periphery of blade 810. Cutter elements 824 are substantially identical to one another, and each of them comprises a base portion 826 on an outer end of which is a tooth 828 having a cutting edge 830 defined by a rake face 832 and a clearance face 834 preferably inclined at an angle of about 10 to 15 degrees from each another. Rake face 832 is preferably included at an angle of about 45 degrees to 50 degrees to a radius of saw blade 810.

Figure 12:
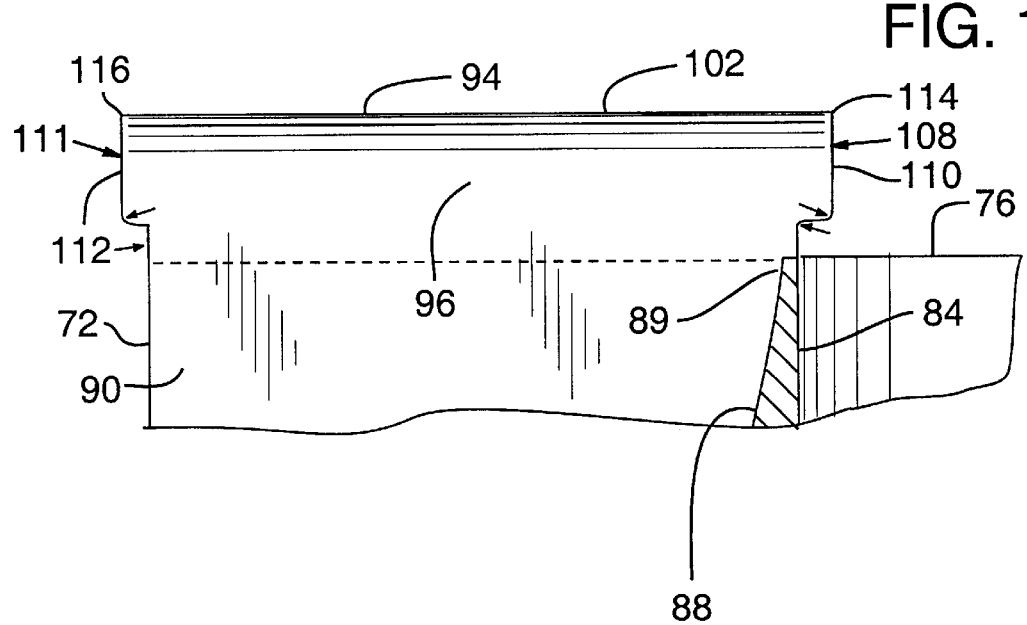
FIG. 12 is an end view of the bit illustrated in FIG. 11 looking in the direction of the arrows 12—12 of FIG. 11.

As shown in FIGS. 35 and 37, an outer end portion 838 of a tooth 828 defines a cutting edge 830 that is greater in width than base portion 826 thereof. Outer end portion 838 is provided with opposite guide faces 840 and 842 that are spaced outwardly from but parallel to the planes of side surfaces 818 and 820 of saw blade 810 to provide sufficient clearance for blade 810 that it will rotate freely in the kerf cut by teeth 828, the spacing preferably being in the range of 0.010–0.015 inch (0.25–0.4 millimeter) in the usual case. Each of guide faces 840 and 842 has a width in the radial direction at least equal to the depth of cut made by a tooth 828 and a substantially equal depth in the circumferential direction. As best seen in FIG. 37, guide faces 840 and 842 define the widest part of blade 810. The design criteria of guide faces 840 and 842 of a tooth 828 are analogous to those of cutting tooth 94, as best shown in FIGS. 11 and 12.

FIGS. 38 and 39 show a circular hole-cutting drill bit 900 made in accordance with the invention to have two inclined cutting teeth 902a and 902b lying in a common plane and joined to form a pointed tip 904 that first contacts a work piece being cut. Drill bit 900 is similar to a conventional drill bit in that drill bit 900 has an elongate body 906 in which two interlaced spiral flutes 908 and 910 are formed and has pointed tip 904 at the apex of a work engaging end 912. Tip 904 lies on a longitudinal axis 914 of drill bit 900.

The inclined portion of cutting tooth 902a is configured to have a cutting edge 916a that extends between tip 904 and a guide projection 918a formed at the periphery of work engaging end 912, and the inclined portion of cutting tooth 902b is configured to have a cutting edge 916b that extends between tip 904 and a guide projection 918b formed at the periphery of work engaging end 912. Guide projections 918a and 918b are positioned at the ends of cutting teeth 902a and 902b on opposite sides of the periphery of work engaging end 912 and equidistant from axis 914. Guide projections 918a and 918b have respective guide faces 920a and 920b that are parallel to longitudinal axis 914. The design criteria for each of guide projections 918a and 918b and their respective guide faces 920a and 920b are analogous to those described for guide projection 35 of drill bit 10 shown in FIGS. 1–5. Skilled persons will appreciate that the invention can be practiced with more than two cutting teeth joined at a penetration tip that is coincident with the axis of the tool. The guide projections are spaced apart from one another on the peripheries of such tools by amounts that keep balanced the lateral forces exerted against the side surfaces of the holes being cut.

Figure 40:
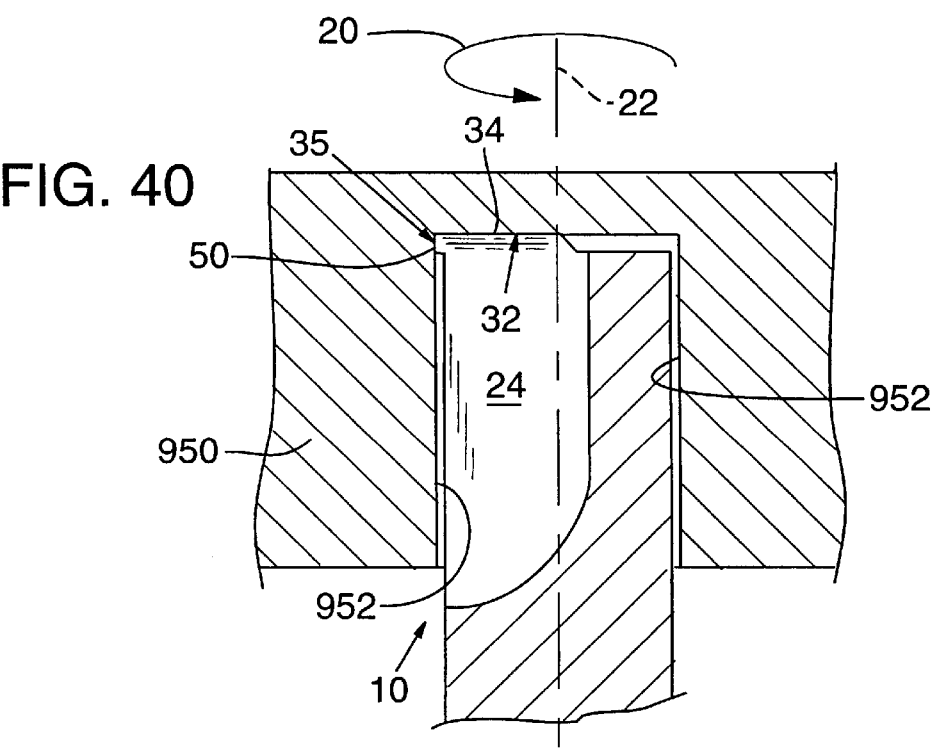
FIG. 40 is a cross sectional view of the drill bit of FIG. 1 cutting a circular hole in a work piece for the purpose of showing the positions of the guide face and cutting edge of the drill bit in the hole as it is being formed.

FIG. 40 illustrates the operating principles underlying all embodiments of the invention by way of example of drill bit 10 cutting a hole in a work piece 950. With reference to FIG. 40, drill bit 10 rotates in direction 20 about axis 22 to form a circular hole in work piece 950. Cutting edge 34 of cutting tooth 32 removes material from work piece 950 in the form of chips that pass through flute 24. Only guide face 50 of guide projection 35 contacts the side surface of the hole being cut to stabilize the lateral forces exerted against drill bit 10 while maintaining minimal heat transfer to work piece 950 during cutting. The result is a dimensionally precise, polished arcuate side surface 952 of the hole formed in work piece 950.

An advantage of the invention is that the material removed from a work piece without the use of a coolant fluid or cooling oil does not require cleaning before recycling.

Having illustrated and described certain preferred embodiments of the invention it will be apparent to those skilled in the art that the invention permits a modification in arrangement and detail. For example, the drill bit tools described above can remain stationary while the work piece rotates to remove material, and the lathe knife can be moved about the surface of a stationary work piece to remove material from it. The scope of the invention should, therefore, be determined only by the following claims.

I claim:

1. A cutting tool for removing material from a work piece and forming a highly polished finished surface on the work piece, comprising:

a body having a driver engaging end and an opposite work engaging end, the body having a side surface and being adapted for rotation in a predetermined direction about an axis relative to the work piece when working;

a cutting tooth formed on the work engaging end, the cutting tooth including a cutting edge extending in a transverse direction to the axis and a guide projection extending a projection distance beyond the side surface of the body and laterally of the axis;

the cutting edge having first and second ends, the first end being nearer to the axis and the second end being nearer to the side surface of the body;

the guide projection having a guide face that is concentric with the axis and intersects the cutting edge to form a sharp corner; and the cutting tooth tapering from and thereby providing relief for the guide face in a direction rearwardly of the guide face and inwardly toward the side surface of the body so that, in rotation of the cutting tool relative to and in engagement against the work piece, no portion of the cutting tooth other than the guide face contacts the surface of the work piece to prevent scoring of the finished surface of the work piece by the surface of the body as the cutting tool advances into the work piece to remove material from it;

whereby the cutting edge transfers to the material removed most of the heat generated to provide a highly polished finished surface on the work piece.

2. The cutting tool of claim 1 in which the work piece remains stationary and the body rotates about the axis when working.

3. The cutting tool of claim 1 in which the guide face has a length that is greater than a depth of cut achieved in the work piece by a cutting tool feed rate that results in at least about 1.5 rotations of the cutting tool relative to the work piece.

4. The cutting tool of claim 1 in which the projection distance has a length, the side surface from which the guide projection extends defines a reference datum for the length of the projection distance, and the cutting edge has a length defined by a straight line distance between the first and second ends, the projection distance being substantially less than the length of the cutting edge.

5. The cutting tool of claim 1 in which the body comprises a cylindrical shaft having a cylindrical side wall and the cutting edge extends radially at its first end from the axis to its second end outwardly of the cylindrical side wall.

6. The cutting tool of claim 5, further comprising an elongate flute formed on the cylindrical side wall, the flute extending from the work engaging end toward the driver engaging end and having a trailing face with respect to the predetermined direction of rotation.

7. The cutting tool of claim 6 in which the cylindrical shaft has a radius and the elongate flute extends generally parallel to the axis and has at the work engaging end a depth greater than the radius of the shaft.

8. The cutting tool of claim 5 in which the work engaging end has a substantially flat face portion from which the cutting edge is inclined.

9. The cutting tool of claim 5 in which the work engaging end has a stepped face portion from which the cutting edge is inclined.

10. The cutting tool of claim 1 in which the cutting edge is positioned so that the first end is never farther away from the driver engaging end than is the second end and is inclined in a direction away from the driver engaging end so that the cutting edge engages the material to be removed from the work piece to form a finished surface on it.

11. The cutting tool of claim 1 in which:

the body is of tubular shape having an inner side surface and an outer side surface, the outer side surface defining the side surface of the body;

the first end of the cutting edge is nearer also to the inner surface of the body;

the guide projection constitutes an outer guide projection, the guide face constitutes an outer guide face, the sharp corner constitutes an outer sharp corner, and the finished surface constitutes an outer finished surface;

the cutting tooth further comprises an inner guide projection extending an inner guide projection distance beyond the inner side surface of the body and laterally of the axis, the inner guide projection having an inner guide face that is concentric with the axis and intersects the cutting edge to form an inner sharp corner; and the cutting tooth tapering from and thereby providing relief for the inner guide face in a direction rearwardly of the inner guide face and inwardly toward the inner side surface of the body so that, in rotation of the cutting tool relative to and in engagement against the work piece, no portion of the inner side surface other than the inner guide face contacts an inner arcuate surface during its formation to prevent scoring the inner arcuate surface of the work piece as the cutting tool advances into the work piece to remove material from it.

12. The cutting tool of claim 11, further comprising an elongate flute formed on the outer side surface of the body and extending from the work engaging end toward the driver engaging end.

13. The cutting tool of claim 12 in which the elongate flute is the form of a spiral that winds around the outer side surface of the body in a direction opposite to the predetermined direction of rotation about the axis.

14. The cutting tool of claim 1 in which the body comprises a cylindrical shaft having a cylindrical side wall with first and second portions of respective smaller and larger radii to form a step transition between the first and second portions, the first and second portions defining the side surface of the body, and the first portion being nearer to the work engaging end and the second portion being nearer to the driver engaging end, the tool further comprising a step transition cutting tooth formed at the step transition, the step transition cutting tooth including a step transition cutting edge extending in a transverse direction to the axis from the cylindrical side wall of the first portion and a step transition guide projection extending a step transition guide projection distance laterally of the axis.

15. The cutting tool of claim 14 in which the step transition guide projection has at least one step transition guide face that is concentric with the axis so that, in rotation of the cutting tool relative to and in engagement against the work piece, no portion of the cylindrical side wall of the second portion other than a step transition guide face contacts an arcuate surface during its formation.

16. The cutting tool of claim 14, further comprising a first elongate flute formed on and extending in a straight line path along the cylindrical side wall of the first and second portions and a second elongate flute formed in the shape of a spiral that winds around the cylindrical side wall of the second portion in a direction opposite to the predetermined direction of rotation about the axis.

17. The cutting tool of claim 1 in which the body comprises an inner cylinder that is concentric with an outer cylindrical segment separated by a gap and having respective inner and outer side walls, the outer side wall of the outer cylindrical segment defining the side surface of the body, the cutting tooth constituting an inner cutting tooth formed on the work engaging end of the inner cylinder and the guide projection constituting an inner guide projection extending an inner projection distance beyond the inner side wall and in the gap between the inner cylinder and outer cylindrical segment, the tool further comprising an outer cutting tooth formed on the work engaging end of the outer cylindrical segment, the outer cutting tooth including an outer cutting edge extending in a transverse direction to the axis and an outer guide projection extending an outer projection distance beyond the outer side wall of the outer cylindrical segment and laterally of the axis.

18. The cutting tool of claim 17, further comprising an elongate flute formed on the inner side wall of the inner cylinder, the flute extending from the work engaging end toward the driver engaging end and having a trailing face with respect to the predetermined direction of rotation.

19. The cutting tool of claim 1 in which:

the body comprises a cylindrical base portion from which a cutter tooth mount extends at the work engaging end to support the cutting tooth, the cutter tooth mount being in the form of a cylindrical segment that is coaxial with the axis and having an inner side surface and an outer side surface, the outer side surface defining a portion of the side surface of the body;

the first end of the cutting edge is nearer also to the inner surface of the body;

the guide projection constitutes an outer guide projection, the guide face constitutes an outer guide face, the sharp corner constitutes an outer sharp corner, and the finished surface constitutes an outer finished surface;

the cutting tooth mount further comprises an inner guide projection extending an inner guide projection distance beyond the inner side surface of the body and laterally of the axis, the inner guide projection having an inner guide face that is concentric with the axis and intersects the cutting edge to form an inner sharp corner; and the cutting tooth tapering from and thereby providing relief for the inner guide face in a direction rearwardly of the inner guide face and inwardly toward the inner side surface of the body so that, in rotation of the cutting tool relative to and in engagement against the work piece, no portion of the inner side surface other than the inner guide face contacts an inner arcuate surface during its formation to prevent scoring the inner arcuate surface of the work piece as the cutting tool advances into the work piece to remove material from it.

20. The cutting tool of claim 1 in which the body comprises a cylindrical shaft having a cylindrical side wall and the cutting edge extends radially at its first end from the axis to its second end outwardly of the cylindrical side wall, the tool further comprising at least one body flexure stabilizing guide projection that is angularly spaced from the guide projection of the cutting tooth and extends a flexure stabilizing projection distance beyond the side surface of the body and laterally of the axis, each body stabilizing guide projection having a body stabilizing guide face that is concentric with the axis so that, in rotation of the cutting tool relative to and in engagement against the work piece, no portion other than the cutting tooth and each body stabilizing guide face contacts the surface of the work piece.

21. The cutting tool of claim 1 in which the cutting edge lies in a plane that is perpendicular to the axis and engages the work piece to cut a flat-bottomed hole into the work piece.

22. The cutting tool of claim 1 in which the cutting edge extends in a direction that is transverse to the axis such that the second end of the cutting edge first engages the work piece as the cutting tool advances into the work piece to cut a hole having a conical bottom.

* * * * *